US008585155B2

(12) United States Patent
Kuttner et al.

(10) Patent No.: US 8,585,155 B2
(45) Date of Patent: Nov. 19, 2013

(54) METHOD AND SYSTEM FOR FORMING A WHEEL STRUCTURE

(75) Inventors: Oliver Christoph Ferdinand Kuttner, Charlottesville, VA (US); Ronald Christopher Mathis, Indianapolis, IN (US)

(73) Assignee: Edison2 LLC, Charlottesville, VA (US)

( * ) Notice: Subject to any disclaimer, the term of this patent is extended or adjusted under 35 U.S.C. 154(b) by 356 days.

(21) Appl. No.: 13/148,052

(22) PCT Filed: Mar. 16, 2011

(86) PCT No.: PCT/US2011/028586
§ 371 (c)(1),
(2), (4) Date: Aug. 5, 2011

(87) PCT Pub. No.: WO2011/129941
PCT Pub. Date: Oct. 20, 2011

(65) Prior Publication Data
US 2012/0235465 A1    Sep. 20, 2012

(51) Int. Cl.
*B60B 3/08* (2006.01)
*B60B 23/00* (2006.01)

(52) U.S. Cl.
USPC .............................. 301/64.302; 301/64.305

(58) Field of Classification Search
USPC ............. 301/63.107, 63.108, 64.201, 64.202, 301/64.301, 64.302, 64.303, 64.305, 301/64.306, 95.107
See application file for complete search history.

(56) References Cited

U.S. PATENT DOCUMENTS

| | | | | |
|---|---|---|---|---|
| 1,205,882 A * | 11/1916 | Gadoux | ........................ | 301/6.1 |
| 1,325,120 A * | 12/1919 | Simmons | ................... | 301/35.63 |
| 1,427,209 A * | 8/1922 | Harvey | ..................... | 301/64.302 |
| 1,443,717 A * | 1/1923 | Rey | ......................... | 301/64.101 |
| 1,445,492 A | 2/1923 | Deady | | |
| 1,466,468 A * | 8/1923 | Charter | .................... | 301/64.302 |
| 2,038,211 A * | 4/1936 | Frank | ....................... | 301/64.302 |
| 2,048,443 A * | 7/1936 | Frank | ............................ | 301/6.2 |
| 2,084,391 A * | 6/1937 | Frank | ............................ | 301/6.2 |
| 2,214,319 A * | 9/1940 | Bourdon | ................. | 301/63.107 |
| 2,406,068 A * | 8/1946 | Frank | ........................ | 301/63.109 |
| 3,802,744 A * | 4/1974 | Grawey et al. | .......... | 301/64.305 |
| 4,178,041 A | 12/1979 | Rush | | |
| 4,640,330 A | 2/1987 | Frassica | | |
| 6,116,700 A | 9/2000 | Herrera | | |
| 2007/0158997 A1 | 7/2007 | Raymond | | |

(Continued)

OTHER PUBLICATIONS

International Search Report dated May 12, 2011, for International Patent Application No. PCT/US2011/028586.

*Primary Examiner* — Joseph Rocca
(74) *Attorney, Agent, or Firm* — Thomas & Karceski, PC

(57) ABSTRACT

A wheel structure for use in an engine-powered vehicle having an inner rim, an outer rim, an inner, partially truncated, cone-shaped element, a hub and a closing portion. The outer rim is sealingly attached to the inner rim, while the inner cone-shaped element is oriented with an opening at its truncated vertex end closer to the inner rim than its base and is then attached around the perimeter of its base to the perimeter of the outer rim. A closing portion with an opening at its center is provided which is attached at its perimeter to the perimeter of the inner cone-shaped element. The hub is connected on one side to the truncated vertex end of the inner cone and on the other side to the opening at the center of the closing portion.

14 Claims, 3 Drawing Sheets

(56) References Cited

U.S. PATENT DOCUMENTS

2007/0290549 A1 12/2007 Zabaleta
2008/0252135 A1 10/2008 Mills et al.
2011/0006589 A1 1/2011 McCorry et al.

* cited by examiner

METHOD AND SYSTEM FOR FORMING A WHEEL STRUCTURE

CROSS-REFERENCES TO RELATED APPLICATIONS

This is a National Stage entry into the United States Patent and Trademark Office from International Patent Application No. PCT/US2011/028586, filed on Mar. 16, 2011. This application claims priority from U.S. provisional application 61/324,922, filed on Apr. 16, 2010, which is incorporated herein by reference in its entirety.

TECHNICAL FIELD

The subject invention relates generally to the field of wheels for automotive vehicles. More specifically, a wheel structure and method of construction is provided which improves the aerodynamic efficiency of the wheel while simultaneously providing strength and space for locating a suspension system within the wheel.

BACKGROUND OF THE INVENTION

Vehicle wheels are made to standards laid out by the Tire and Rim Association, Inc. One requirement of a conventional wheel, included in the standards, is a well whose purpose is to allow the tire's bead to be installed over the rim flanges. FIG. 1 is an outline of a cross-sectional profile of a J-section wheel rim conforming to the standards established by the Tire and Rim Association, Inc. A large well is clearly visible in the approximate center of the cross section. Such J-section wheel rims are the most commonly used rims in current automobiles.

Multi-piece wheels (typically a centre and an inner and outer rim that bolt together) have been used in racing and high performance street applications for many years. Their advantage over single piece wheels is that a multitude of rim widths and offsets can be assembled from a limited parts inventory. However, such wheels are conventionally completely assembled before the tire is mounted so they still need a well. The inclusion of a well in a wheel rim results in imposition of a limitation on space available for large brake systems or for suspension systems within the space beneath the rim and thereby also restricts the freedom of the engineer to implement design innovations for conventional or novel suspension systems Elimination of the wheel well in a rim is known in the art but is often used in combination with wheels having wire spokes or holes in the central body of the wheel. Such spokes or holes are typically incorporated in wheel design in order to reduce the weight of the wheel while still providing the strength necessary to withstand the various physical force vectors applied to the wheel during driving. Unfortunately, these same spokes and holes disturb the flow of air past the wheel when the vehicle is in motion causing aerodynamic inefficiencies. Elimination of such inefficiencies by eliminating wheel spokes while retaining space within the wheel for locating a suspension system without sacrificing wheel strength would be a desirable advance in the wheel structure art.

SUMMARY OF THE INVENTION

This invention relates to a wheel structure for an automotive vehicle and a method for forming that structure. A wheel structure is disclosed in which an inner rim having a first outer flange and a first inner flange is sealingly connected at the first inner flange to a second inner flange of an outer rim which also has a second outer flange. A hollow, open-based inner cone is partially truncated for a distance below its vertex leaving an opening. This inner cone has a third outer flange formed around and extending away from the perimeter of its base and a third inner flange formed around and extending inwardly from this opening. The inner cone is oriented with the third inner flange closer to the first outer flange than the third outer flange of the inner cone and is attached to the second outer flange of the outer rim at its third outer flange. A generally cylindrical hub having a left flange and a right flange is further attached at its left flange to the third inner flange of the inner cone. A closing portion is further provided having a fourth inner flange formed around and extending inwardly from an opening formed at its center and a fourth outer flange formed around and extending away from its perimeter. The fourth inner flange of the closing portion is attached to the right flange of the hub and the fourth outer flange of the closing portion is attached to the third outer flange of the inner cone.

In various embodiments, the closing portion may be a hollow, open-based cone partially truncated from its apex either with the fourth inner flange located axially further away from the first outer flange of the outer rim than is the fourth outer flange thereby forming a convex surface or with the fourth inner flange located axially closer to the first outer flange of the outer rim than is the fourth outer flange thereby forming a concave surface. In yet another embodiment, the closing portion may be a substantially flat surface.

A method for constructing the wheel structure involves sealingly attaching the second inner flange of the outer rim to the first inner flange of the inner rim. Then, the third outer flange of the inner cone is attached to the second outer flange of the outer rim. Next, the left flange of the hub is attached to the third inner flange of the inner cone. Finally the fourth inner flange of the closing portion is attached to the right flange of the hub, and the fourth outer flange of the closing portion is attached to the third outer flange of the inner cone.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 1:
FIG. 1 is an outline of the cross-sectional profile of a conventional wheel rim incorporating a wheel well.
Figure 2:
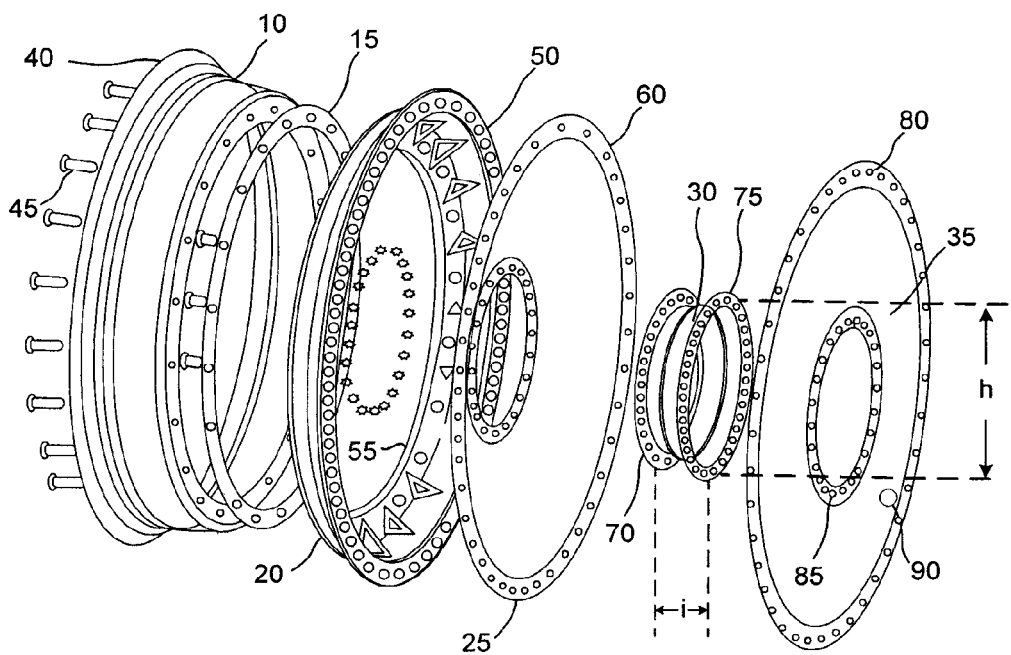
FIG. 2 is an exploded view of the elements of a wheel rim constructed according to the principles of this invention.
Figure 3:
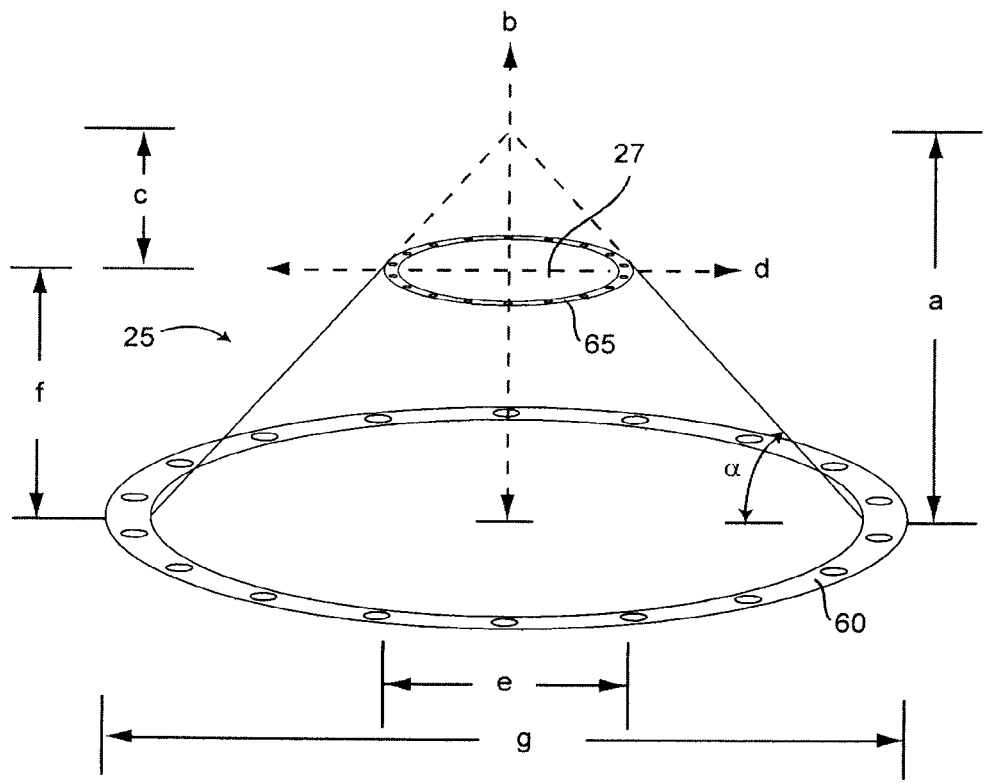
FIG. 3 is a perspective view showing the structure of an inner cone constructed according to the principles of this invention.

A wheel for use with a multi-passenger, multi-wheeled, engine-powered vehicle suitable for use on roads and high speed highways is disclosed. A tire is normally installed on each such wheel prior to use with such a vehicle. FIG. 1 is an outline of a cross-sectional view of the profile of a conventional wheel rim incorporating a wheel well. As will become evident below, the wheel of this invention is best used with a well-less wheel although it may also be adapted for use with a wheel having a well. FIG. 2 is an exploded view of the elements of a first preferred embodiment of wheel rim 5 constructed according to the principles of this invention. The wheel structure is comprised of inner rim 10, gasket ring 15, outer rim 20, hollow, open-based inner cone 25, hub 30 and hollow, open-based outer cone 35. Inner rim 10 is typically constructed of a metal or metallic alloy and has a first outer flange 40 around its outside edge protruding away from the rim and a first inner flange 45 around its inside edge extending towards the center of the rim, first inner flange 45 having a series of holes formed therein around its entire circumference. Some means of sealing inner rim 10 and outer rim 20 is required. Various types of sealing may be used, such as, but not limited to, silicone sealant and/or a gasket ring. In the version of wheel rim 5 illustrated in FIG. 2, gasket ring 15 is used which may be, but is not limited to, an aluminum ring with a rubber seal bonded to its outside edge and with a series of holes formed therein around the entire ring. Outer rim 20 is constructed from a metal or metallic alloy and has a second outer flange 50 extending away from its center in which a series of holes are formed. Outer rim 20 also has a further series of holes formed in a second inner flange 55 which extends from its base inwardly towards its center. FIG. 3 presents a perspective view showing the formation of open-based hollow inner cone 25 constructed according to the principles of this invention. Referring now to FIG. 3, a perspective view of hollow inner cone 25, which may be constructed from a composite material such as, for example, carbon fiber or carbon/epoxy, is presented. The material must have a yield stress greater than 10,000 psi and can be manufactured by a variety of methods including, but not limited to, molding, pressing or spinning. The thickness of the material depends on a multitude of factors such as wheel diameter and expected loads, but is typically in a range between 0.020 inches and 0.200 inches. Cone 25 is that truncated part of an open-based cone structure having an original height a as measured from its vertex to its hypothetical base along an axis b perpendicular to the base from which a smaller conical portion having a height c has been removed along a plane d which is perpendicular to axis b and parallel to the base of cone 25, leaving an opening 27 having an outer diameter e. The height of the remaining portion of inner cone 25 is f. The base of inner cone 25 has an inner diameter g which is substantially equal to the inner diameter of outer rim 20 as measured across outer rim 20 at second outer flange 50. In addition, inner cone 25 is formed with a generally flat third outer flange 60 around its perimeter substantially parallel with plane d and extending away from its base having a series of holes formed therein as well as a generally flat third inner flange 65 also substantially parallel with plane d and extending inwardly from the continuous wall of cone 25 into opening 27 towards vertex axis b and having a series of holes formed therein. The width of third outer flange 60 is substantially equal to the width of second outer flange 50 of outer rim 20. A vertical cross section of inner cone 25 would show that an angle $\alpha$ is formed between the wall and the hypothetical base of cone 25. In the preferred embodiment, angle $\alpha$ may be between 10 and 30 degrees, preferably 21 degrees. Hub 30 is a partially hollow metallic cylinder designed for attachment to a vehicle axle, braking and/or suspension system which has an outer diameter h approximately equal to diameter e of opening 27, a height i and includes a left flange 70 on one side thereof and a right flange 75 on the opposite side thereof. The axial separation between flanges 70 and 75 (height i in FIG. 2) may vary depending on factors including, but not limited to, the desired cone angles $\alpha$ and $\beta$ (discussed below with regard to FIGS. 6 and 7), tire size and the desired diameter and axial position of second outer flange 50. Height i is typically between 1 inch and 12 inches. Each flange 70 and 75 has a series of holes formed therein. The width of flange 65 of inner cone 25 is determined by and is substantially equal to the width of flange 70 of hub 30, while the distance c is determined by that amount of the top of inner cone 25 which must be removed so that height f of the remaining portion of inner cone 25 approximately equals height i of hub 30.

Figure 4:
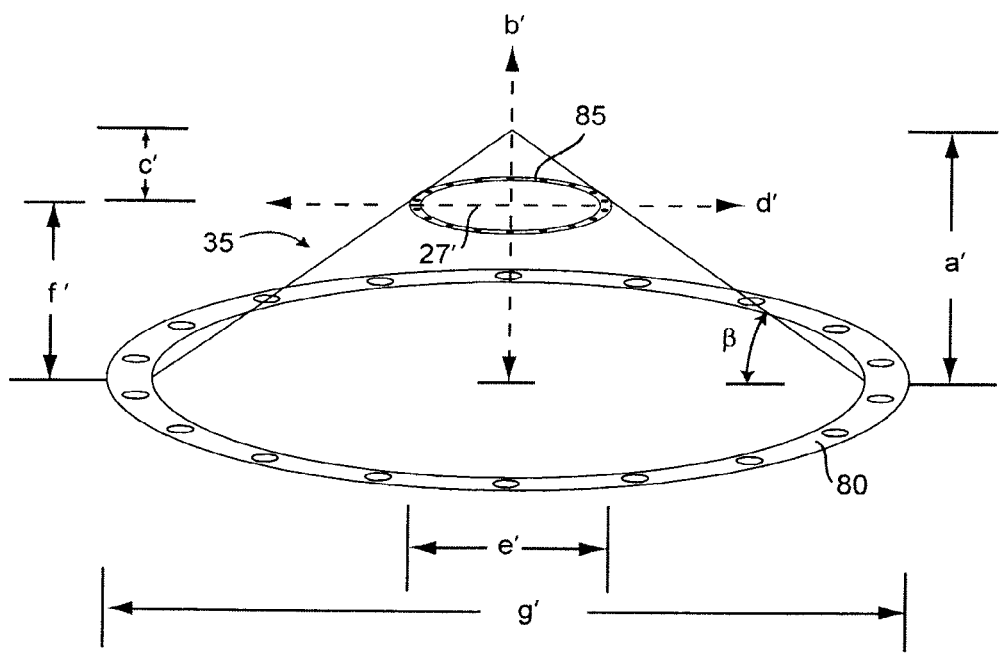
FIG. 4 is a perspective view showing the structure of an outer cone constructed according to the principles of this invention.

Referring now to FIG. 4, an exaggerated perspective view of open-based hollow outer cone 35 (also referred to as a closing portion) is shown. Outer cone 35 may be constructed of the same material with the same thickness as hollow inner cone 25 and also has a continuous side wall. Truncated outer cone 35 is formed in a manner analogous to hollow inner cone 25 along plane d' which is parallel to its hypothetical base. Its diameters e' and g' coincide with the diameters e and g of inner cone 25. But, since in the preferred embodiment it is formed with a much smaller angle $\beta$ of only approximately 1 to 3 degrees between its side and its base, as discussed below with regard to FIG. 7, heights a' and f' for outer cone 35 are substantially less than heights a and c for inner cone 25 and are a function of forming a cone having a known diameter g', the side wall of which forms an angle $\beta$ with its base. However, similar to inner cone 25, outer cone 35 is formed around its perimeter with a generally flat fourth outer flange 80 substantially parallel with plane d' and extending away from its base having a series of holes formed therein as well as a generally flat fourth inner flange 85 also substantially parallel to plane d' and extending inwardly from the wall of cone 35 into its respective opening 27' towards its vertex axis b' and having a series of holes formed therein. The width of fourth outer flange 80 is substantially equal to the width of second outer flange 50 of outer rim 20. The width of flange 85 of outer cone 35 is determined by and substantially equal to the width of flange 75 of hub 30. Each of the holes in each of the series of holes formed in each of the flanges recited above with regard to cones 25 and 35 may have approximately the same diameter and be spaced preferably equidistant from its neighboring hole although holes of differing diameters and spacing could be used, if desired, so long as a sufficient number of holes in the different flanges could be aligned with each other to facilitate attachment of the flanges to each other. Alternatively, the holes could be partially or completely eliminated on some or all of the components, and the different components could be attached to each other by adhesive means or a combination of bolting, riveting and/or adhesive means. In the preferred embodiment, outer cone 35 is designed to be assembled into wheel 5 oriented such that opening 27' faces outwardly from the wheel thereby forming a slightly convex surface when viewed from the outer cone side of assembled wheel 5. This arrangement has the advantage that it inhibits the accumulation of dirt while the wheel is in motion by assisting the tire in sloughing off such dirt through centrifugal forces. In alternative embodiments, outer cone 35 could also be oriented such that opening 27' faces inwardly towards the interior of the wheel thereby forming a concave surface when viewed from the outer cone side of assembled wheel 5. In such a design, flange 50 of outer rim 20 could be coextensive with or even extend axially beyond flange 75 of hub 30. In yet another embodiment, outer cone 35 could be replaced by a flat surface without conical features but otherwise having the e', g' and flange dimensions discussed with regard to the preferred embodiment. Thus, an advantage of a wheel constructed according to the principles of this invention is that it provides an engineer the flexibility to design the wheel in any of the aforementioned variations.

Figure 5:
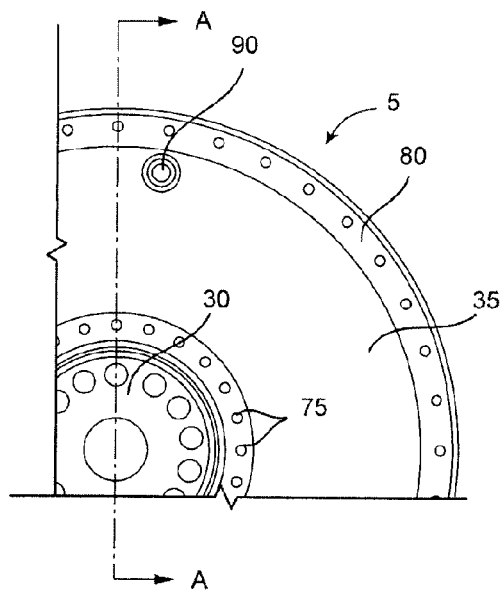
FIG. 5 is a side view of a wheel embodying the principles of this invention.

Turning now to FIG. 5, a partial side view of an assembled wheel structure 5 constructed according to the principles of this invention is shown. Hub 30, outer flange 80 and inner flange 85 of outer cone 35 are visible. In addition, opening 90 in outer cone 35 is displayed. Opening 90 is provided for access to a tire air valve (not shown).

Figure 6:
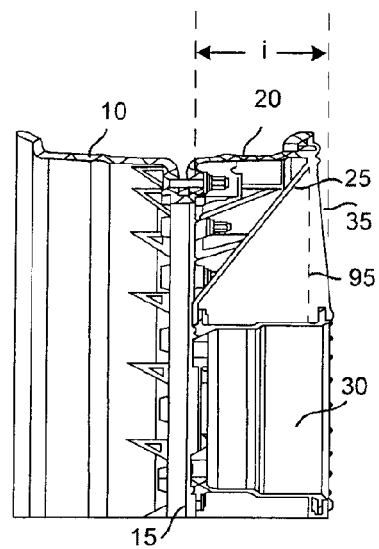
FIG. 6 is a cross-sectional view of a wheel rim embodying the principles of this invention.

In FIG. 6, a cross-sectional side view of the wheel structure of FIG. 5 along line A-A is presented. The wheel structure of the preferred embodiment of FIG. 6 does not incorporate a wheel well but rather provides a relatively flat surface across the rim area of the wheel structure, thereby differentiating it from the common conventional wheel construction illustrated in FIG. 1. In other embodiments, the principles of this invention could also be employed in wheels which do include a wheel well. Outer rim 20 is shown attached to inner rim 10, while cross-sections of inner cone 25 and outer cone 35 are shown attached respectively to the outside of hub flanges 70 and 75. Line 95 is a nonstructural vertical engineering base line drawn parallel and tangent to the plane representing the outer face of outer flange 50 of outer rim 20 which line has been included in order to demonstrate the relative positioning of inner cone 25 and outer cone 35 as further discussed with regard to FIG. 7 and FIG. 8.

Figures 7, 8:
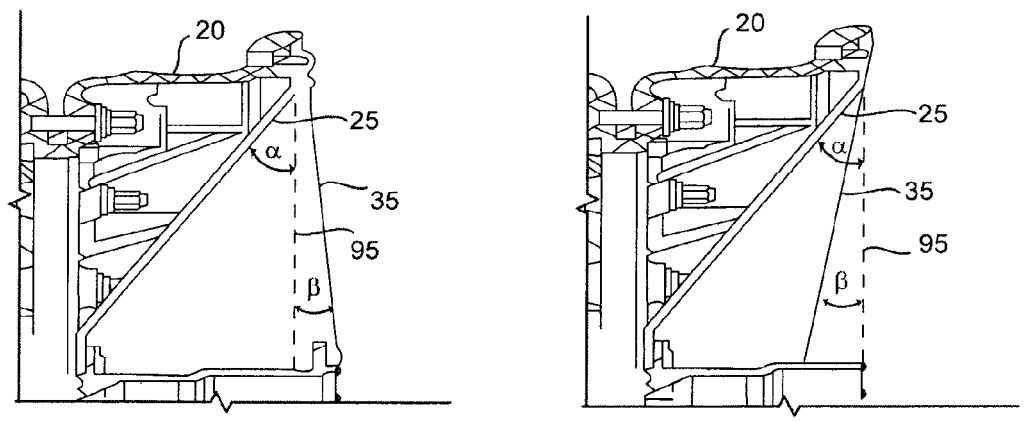
FIG. 7 is an exploded view of a portion of FIG. 6 showing the angles formed by the cones used in constructing a wheel according to the principles of this invention.
FIG. 8 is an exploded view of a portion of FIG. 6 showing the angles formed by the cones used in constructing an alternative embodiment of a wheel according to the principles of this invention.

FIG. 7 is an exploded view of the upper right circled portion of FIG. 6 and illustrates the important relationship between angle α of inner cone 25 and β of outer cone 35 in the construction of a wheel according to the principles of this invention. As indicated above, any wheel used in a powered vehicle must be strong enough to withstand force vectors generated in multiple directions including radial, lateral and torsional, to all of which it will be subjected while the vehicle is being driven. Torsional forces are generated both when the hub and rim temporarily run at different rotational speeds and when the hub and rim run in different planes. The conventional methods of providing such strength have been through the use of separate spokes or single surfaces into which holes have been introduced. Both of these methods result in aerodynamic inefficiencies. One way to avoid the aerodynamic problems would be to use a solid vertical wall spanning the diameter of the wheel. However, the required thickness of such a wall to enable it to withstand the previously mentioned force vectors would make it heavy, more costly to produce, and, by virtue only of its added weight, even more inefficient. Novel aspects of this invention are that it overcomes the aforementioned problems and provides structural efficiency by using material where it produces the most beneficial results. As shown in the cross-sectional representation of FIG. 7, hollow inner cone 25 forms an angle α with line 95 representing a side view of the plane drawn parallel to the outer face of outer flange 50 of outer rim 20, while hollow outer cone 35 has a convex shape when viewed from outside wheel 5 and forms a lesser angle β with vertical line 95. Angle α is large enough to provide sufficient structural strength to withstand the aforementioned force vectors while still being small enough to minimize the space occupied by inner cone 25, leaving sufficient space within the center of wheel 5 for the placement of suspension and/or brake systems, as desired, within inner rim 10 of wheel 5. The exact size of angle α is dependent on the size of outer rim 20 and of hub 30 which are governed in any particular case in part by the diameter and tread width of the tire with which the wheel structure is being used. Thus, angle α must be greater than 0 degrees and may be as much as 45 degrees. Simultaneously, angle β in the preferred embodiment is small enough to substantially eliminate the aerodynamic efficiencies of conventional structures known in the art while at the same time enhancing aerodynamic efficiency by providing a convex surface which inhibits the accumulation of dirt or other substances on the wheel. Although in the preferred embodiment, angle β is between 1 and 3 degrees, in other configurations, angle β may be between 0 degrees (i.e., vertical) and up to 30 degrees so long as outer cone 35 is not coextensive with and is located more towards the outside of wheel 5 than inner cone 25. FIG. 8 shows a cross-sectional exploded view of an alternative embodiment of the elements of wheel 5 similar to FIG. 7 in which outer cone 35 has a concave shape when viewed from outside wheel 5 and angle β is formed inside vertical line 95.

An alternative embodiment of wheel 5 is comprised only of inner rim 10 which is bolted or otherwise fastened to outer rim 20. A seal of one of the types disclosed above with regard to gasket 15 is placed between inner rim 10 and outer rim 20 prior to fastening. In this embodiment, either inner rim 10 or outer rim 20 may be made integral with hub 30 and the possible inclusion of spokes. In another embodiment, inner cone 25 could be cast as part of wheel 5 and then outer cone 35 could be separately attached to the wheel by adhesion, bolting, riveting, gluing or by some other means. In yet a further embodiment, inner cone 25 and outer cone 35 could be attached to each other by adhesive, bolting, riveting, gluing or some other means and thereafter attached to the wheel. In still another embodiment, inner cone 25 and outer cone 35 could be cast together with hub 30 as one piece and thereafter fastened to wheel 5 by adhesion, bolting, riveting, gluing or any other sufficiently strong means. Other construction variations are also possible so long as the features described above are incorporated into the wheel.

Thus, advantages of a wheel constructed according to the principles of this invention are that it is structurally strong and structurally efficient, has superior aerodynamic characteristics and, in addition, is less expensive to build and weighs less than other wheels known in the art since it uses fewer parts and since what material is present is most advantageously distributed. By providing a continuous surface through the use of two cones joined at their outer edges, wheels constructed according to the principles of this invention offer axial strength and stiffness, and can accept compression, tension, shear and torsion loads. Consequently, wheels using the principles of this invention can be very light and use any desired combination of rim width, diameter and axial position of the wheel rim relative to the hub mounting face represented by flange 75. Moreover, by assembling the wheel from separate parts, each part can be manufactured using the most advantageous method resulting in a particularly efficient use of materials. An additional advantage of a wheel constructed according to this invention is that by providing a continuous, smooth outer surface for the wheel the wheel does not tend to collect mud when driven in rough and dirty conditions which further enhances its aerodynamic efficiency.

The preferred embodiment of wheel structure 5 may be assembled as follows. The holes in gasket 15 are aligned with the holes in first inner flange 45 of inner rim 10. Next, the holes in second inner flange 55 of outer rim 50 are also aligned with the pre-aligned holes in gasket 15 and inner flange 45. Thereafter, inner rim 10, gasket 15 and outer rim 20 are affixed to each other by means of nuts and bolts, screws, adhesive or other attachment means inserted through the aligned holes from the exterior towards the center of wheel structure 5. Note that in alternative embodiments, the holes in any or all of the flanges of the various elements of wheel 5 could be eliminated and the various elements could be attached to each other adhesively. Then, inner cone 25 is aligned so that opening 27 points towards outer rim 20. After the holes in left flange 70 of hub 30 are aligned with the holes in third inner flange 65 of inner cone 25, these two components are attached to each other by means of bolts, screws, adhesive or other attachment means extending from the inner rim side of hub 30 through third inner flange 65 and left flange 70. Alternatively, hub 30 may be permanently assembled together with either inner rim 10 or outer rim 20, as desired, prior to assembly of wheel structure 5 by attaching hub 30 to the respective rim using rivets and structural adhesive or by another attachment means. Thereafter, the holes in third outer flange 60 of inner cone 25 are aligned with the holes formed in second outer flange 50 of outer rim 20. Subsequently, outer cone 35 is oriented so that its opening 27' faces outwardly from the wheel and away from inner cone 25 thereby forming a slightly convex surface. The holes in fourth outer flange 80 in outer cone 35 are then aligned with the holes in third outer flange 60 of inner cone 25. Due to pre-arrangement of the location of the holes formed in right flange 75 of hub 30 and those formed in fourth inner flange 85 of outer cone 35, when the afore-described alignment of third outer flange 60 and fourth outer flange 80 occur, alignment of the holes in right flange 75 of hub 30 and fourth inner flange 85 of outer cone 35 follows automatically. Bolts, screws, rivets, adhesive or other suitable attachment means are then inserted into and/or around the holes in fourth outer flange 80 of outer cone 35 through the holes in third outer flange 60 of inner cone 35 and the holes in second outer flange 50 of outer rim 20 to secure these components together. Finally, bolts, screws, rivets, adhesive or other suitable attachment means are also inserted into and/or around the holes in fourth inner flange 85 of outer cone 35 and through right flange 75 of hub 30 to secure these components together. In each case described above, where bolts are used to attach components to each other, other adhesive means such as glue can be used in addition to or as a substitute for the bolts or other attachment means used. The order in which the components are assembled is not important so long as the overall structure is maintained. The method of assembly of wheel 5 differs in the event one of the alternative embodiments described above is employed to reflect the combination of various elements prior to assembly since various assembly steps would by necessity be eliminated.

The foregoing invention has been described in terms of a preferred embodiment and several alternative embodiments. However, it will be apparent to those skilled in the art that various modifications and variations can be made to the disclosed apparatus and method without departing from the scope or spirit of the invention and that legal equivalents may be substituted for the specifically disclosed components and elements of the invention. Therefore, it is intended that the present invention not be limited to the particular embodiments disclosed as the best mode contemplated for carrying out the present invention, but that the present invention include all embodiments falling within the scope of the appended claims.

What is claimed is:

1. A wheel for use with a powered vehicle, the wheel having an inner rim to be mounted facing the interior of the vehicle affixed to an outer rim to be mounted facing the exterior of the vehicle, the outer rim further having an attachment outer flange around its outer perimeter, comprising:

a hollow, open-based inner cone having a side wall, an outer flange extending around the perimeter of its base and an inner flange extending around an opening formed below its vertex, a portion of said inner cone having been truncated, the vertex of said inner cone being oriented towards the inner rim of the wheel and the outer flange of which is attached to the attachment outer flange of the outer rim;

a generally cylindrical hub having a left flange and a right flange, the left flange of which is attached to the inner flange of said inner cone; and a hollow, open-based outer cone having a side wall, an outer flange extending around the perimeter of its base and an inner flange extending around an opening formed below its vertex, a portion of said outer cone having been truncated, the vertex of said outer cone being oriented away from the inner rim of the wheel and the outer flange of which is attached to the outer flange of said inner cone while the inner flange of which is attached to the right flange of said hub.

2. The wheel of claim 1 wherein an angle $\alpha$ is formed between the side wall of said inner cone and a plane defined by and coincident with the attachment outer flange of the outer rim which is greater than 0 degrees and less than 45 degrees and wherein further an angle $\beta$ is formed between the wall of said outer cone and the plane defined by and coincident with the attachment outer flange of the outer rim which is between 0 degrees and −30 degrees with respect to angle $\alpha$.

3. The wheel of claim 2 wherein angle $\alpha$ is between 10 and 30 degrees and angle $\beta$ is between −1 and −3 degrees with respect to angle $\alpha$.

4. The wheel of claim 3 wherein angle $\alpha$ is 21 degrees.

5. The wheel of claim 1 wherein the inner rim and the outer rim present a substantially flat surface across a rim area thereof.

6. The wheel of claim 1 wherein the outer rim and the inner rim are constructed as a single piece.

7. A wheel for use with a powered vehicle, the wheel having an inner rim to be mounted facing the interior of the vehicle affixed to an outer rim to be mounted facing the exterior of the vehicle, the outer rim further having an attachment outer flange around its outer perimeter, comprising:

a hollow, open-based inner cone having a side wall, an outer flange extending around the perimeter of its base and an inner flange extending around an opening formed below its vertex, a portion of said inner cone having been truncated, the vertex of said inner cone being oriented towards the inner rim of the wheel and the outer flange of which is attached to the attachment outer flange of the outer rim;

a generally cylindrical hub having a left flange and a right flange, the left flange of which is attached to the inner flange of said inner cone; and a hollow, open-based outer cone having a side wall, an outer flange extending around the perimeter of its base and an inner flange extending around an opening formed below its vertex, a portion of said outer cone having been truncated, the vertex of said outer cone being oriented towards the inner rim of the wheel and the outer flange of which is attached to the outer flange of said inner cone while the inner flange of which is attached to the right flange of said hub.

8. The wheel of claim 7 wherein an angle $\alpha$ is formed between the side wall of said inner cone and a plane defined by and coincident with the attachment outer flange of the outer rim which is greater than 0 degrees and less than 45 degrees and wherein further an angle $\beta$ is formed between the wall of said outer cone and the plane defined by and coincident with the attachment outer flange of the outer rim which is less than angle $\alpha$ and also between 0 degrees and 30 degrees with respect to angle $\alpha$.

9. The wheel of claim 8 wherein angle $\alpha$ is between 10 and 30 degrees and angle $\beta$ is between +1 and +3 degrees with respect to angle $\alpha$.

10. The wheel of claim 9 wherein angle $\alpha$ is 21 degrees.

11. The wheel of claim 7 wherein the inner rim and the outer rim present a substantially flat surface across a rim area thereof.

12. The wheel of claim 7 wherein the outer rim and the inner rim are constructed as a single piece.

13. A method for constructing a wheel having an inner rim, an outer rim having an attachment outer flange, an inner cone with an outer flange and an inner flange, an outer cone with an inner flange and an outer flange and a hub with a left flange and a right flange comprising:
- attaching the outer flange of the inner cone to the attachment outer flange of the outer rim;
- further attaching the inner flange of the inner cone to the left flange of the hub;
- additionally attaching the outer flange of the outer cone to the outer flange of the inner cone; and
- yet further attaching the inner flange of the outer cone to the right flange of the hub.

14. The method of claim 13 wherein attaching may comprise any one or more of riveting, adhesively adhering, manufacturing by molding, screwing or bolting.

\* \* \* \* \*